(12) United States Patent
Wetzel et al.

(10) Patent No.: US 8,967,181 B2
(45) Date of Patent: Mar. 3, 2015

(54) DIESEL EXHAUST FLUID TANK VENTING SYSTEM

(75) Inventors: Paul C. Wetzel, Oxford, OH (US); Jason M. Crawford, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 594 days.

(21) Appl. No.: 13/353,111

(22) Filed: Jan. 18, 2012

(65) Prior Publication Data

US 2012/0186677 A1     Jul. 26, 2012

Related U.S. Application Data

(60) Provisional application No. 61/433,639, filed on Jan. 18, 2011.

(51) Int. Cl.
  *F16K 24/04* (2006.01)
  *F01N 3/20* (2006.01)
  *B60K 15/035* (2006.01)

(52) U.S. Cl.
  CPC ....... *F01N 3/208* (2013.01); *B60K 2015/03576* (2013.01); *B60K 15/03519* (2013.01); *F01N 2610/1413* (2013.01); *F01N 2610/1466* (2013.01); *Y02T 10/24* (2013.01)
  USPC ............... 137/202; 141/198; 60/274; 60/295; 60/286

(58) Field of Classification Search
  CPC ............... B60K 15/03519; B60K 2015/03576; F01N 2610/1466; F01N 2610/1413
  USPC .............. 137/202; 141/198; 60/274, 295, 286
  See application file for complete search history.

(56) References Cited

U.S. PATENT DOCUMENTS

| | | | |
|---|---|---|---|
| 5,540,047 A * | 7/1996 | Dahlheim et al. | 60/274 |
| 6,708,713 B1 | 3/2004 | Gericke | |
| 8,272,398 B2 * | 9/2012 | Erdmann | 137/533 |
| 8,485,214 B2 * | 7/2013 | Erdmann et al. | 137/198 |
| 8,720,189 B2 * | 5/2014 | Ren et al. | 60/286 |
| 8,726,641 B2 * | 5/2014 | Zanetti et al. | 60/286 |
| 8,763,635 B2 * | 7/2014 | Erdmann | 137/533.11 |
| 8,778,290 B1 * | 7/2014 | Ren et al. | 423/213.2 |
| 8,783,019 B2 * | 7/2014 | Bedford et al. | 60/286 |
| 2006/0011257 A1 | 1/2006 | Devall | |
| 2006/0070656 A1 | 4/2006 | Crawford | |
| 2009/0194170 A1 | 8/2009 | Martin et al. | |

OTHER PUBLICATIONS

International Search Report dated Aug. 27, 2012, for International Application No. PCT/US2012/021725.

* cited by examiner

*Primary Examiner* — Craig Schneider
*Assistant Examiner* — Ian Paquette
(74) *Attorney, Agent, or Firm* — Barnes & Thornburg LLP

(57) ABSTRACT

An exhaust after-treatment system associated with a diesel engine includes a diesel exhaust fluid storage unit. The storage unit includes a diesel exhaust fluid tank and a vent system coupled to the tank and configured to regulate flow of air into the tank and fluid vapor out of the tank.

16 Claims, 8 Drawing Sheets

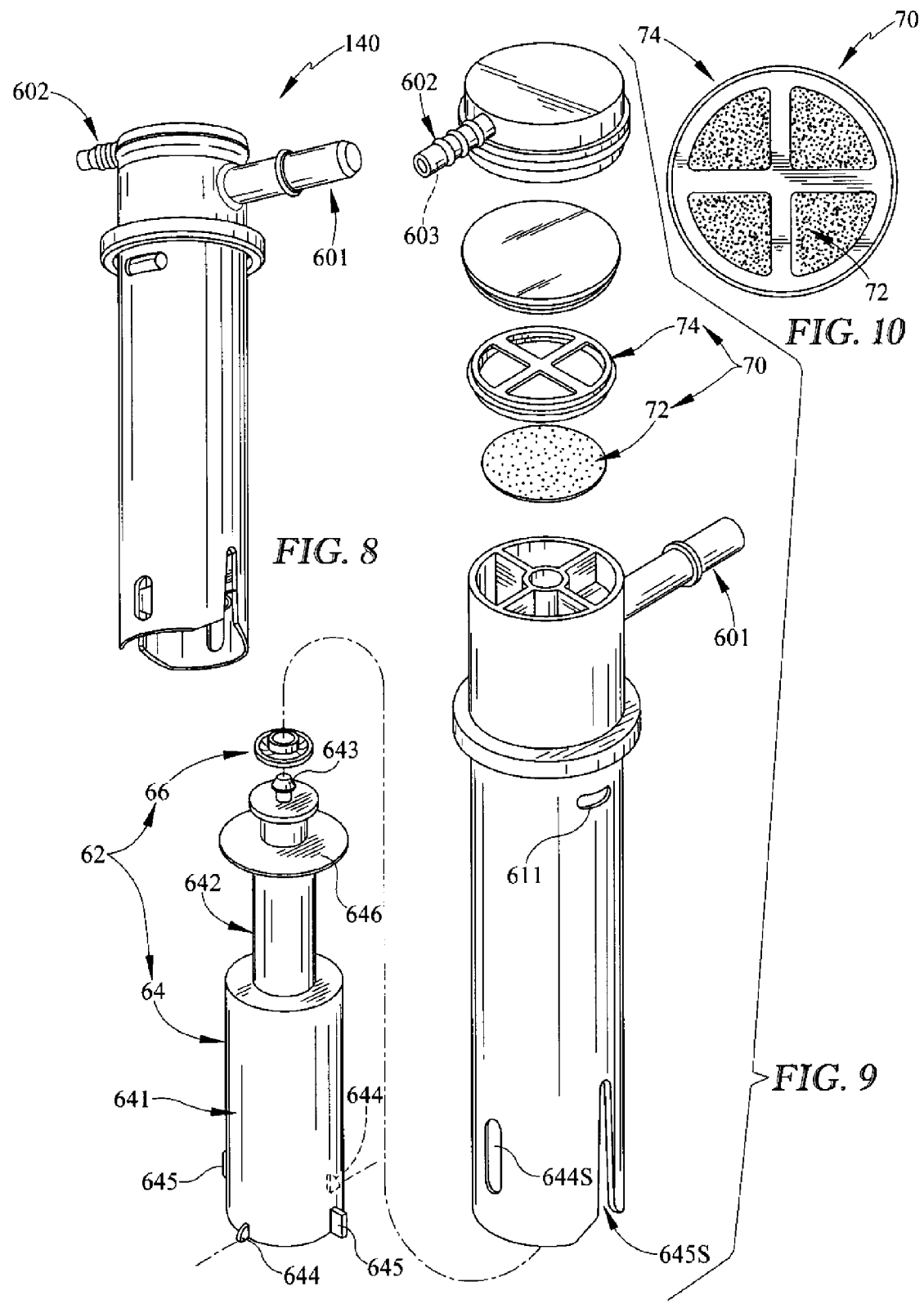

DIESEL EXHAUST FLUID TANK VENTING SYSTEM

PRIORITY CLAIM

This application claims priority under 35 U.S.C. §119(e) to U.S. Provisional Application Ser. No. 61/433,639, filed Jan. 18, 2011, which is expressly incorporated by reference herein.

BACKGROUND

The present disclosure relates to systems for controlling venting of fluid vapors from a diesel exhaust fluid tank, and particularly to a multiple valve tank venting system. More particularly, the present disclosure relates to a tank-mounted tank venting control valve.

SUMMARY

An exhaust after-treatment system associated with a diesel engine includes a diesel exhaust fluid storage unit. The storage unit includes a diesel exhaust fluid tank and a vent system coupled to the tank and configured to regulate flow of air into the tank and fluid vapor out of the tank.

In illustrative embodiments, the vent system includes a tank venting control unit arranged to extend into an interior region of the tank through a single unit-mount aperture formed in the top wall of the tank. The tank venting control unit includes a fill-limit valve module located, for example, in the tank and exposed to fluid vapor extant in the tank, a breather-valve module located outside the tank and exposed to the atmosphere, and a vapor-transfer module interposed between and in fluid communication with each of the fill-limit valve and breather-valve modules.

In illustrative embodiments, the vapor-transfer module is formed to include separate first and second fluid-conducting passageways. The first fluid-conducting passageway conducts fluid from the fill-limit valve module to a tank filler neck via a recirculation line. The second fluid-conducting passageway is arranged to couple the fill-limit valve and breather-valve modules in fluid communication. These passageways conduct fluid to vent the interior region of the tank during certain tank conditions.

The first fluid-conducting passageway formed in the vapor-transfer module normally carries fluid vapor discharged from the fill-limit valve module (and the interior region of the tank) to a recirculation line coupled to a tank filler neck during normal use and refilling of the tank until the level of diesel exhaust fluid in the interior region of the tank has risen to a fill-limit valve closure level causing a buoyant fill-limit valve included in the fill-limit valve module to float upwardly on the rising fluid and close an inlet opening into the first fluid-conducting passageway. Such closure causes tank pressure to rise and forces diesel exhaust fluid up the tank filler neck to trigger a shutoff mechanism included in a fluid-dispensing pump nozzle used to discharge fluid from a diesel exhaust fluid supply into the tank filler neck.

The second fluid-conducting passageway formed in the vapor-transfer module conducts fluid vapor in the interior region of the tank and extant in the fill-limit valve module to an underside of a semi-permeable membrane included in the breather-valve module and configured to have a topside exposed to atmospheric air admitted into an interior chamber formed in the breather-valve module. The semi-permeable membrane is configured to provide breathing means for regulating discharge of fluid vapor through the membrane to the atmosphere and also for regulating admission of atmospheric air through the membrane into the interior region of the tank to dissipate any unwanted negative pressure (i.e., vacuum) developed in the interior region of the tank without exposing the diesel exhaust fluid in the tank to enough air to cause that diesel exhaust fluid to change from a liquid state to an unwanted crystalline state.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 5 is a diagrammatic view showing a DEF storage unit in accordance with the present disclosure along with a DEF delivery system located to the right of the DEF storage unit and a DEF transfer system located under the DEF storage unit and showing (in section) the DEF tank venting control unit of FIG. 2 mounted in a unit-mount aperture formed in the top wall of the DEF tank and that the DEF delivery system is disabled and no diesel exhaust fluid is flowing into the interior region of the DEF tank through the tank filler neck and also showing that the DEF tank venting control unit includes a fill-limit valve module located inside the interior region of the DEF tank, a breather-valve module located outside the DEF tank, and a vapor-transfer module located between the fill-limit valve module and the breather-valve module and formed to include (1) a first fluid-conducting passageway for conducting fluid vapor from the interior region of the DEF tank to a vapor-recirculation line coupled to the tank filler neck and (2) a separate second fluid-conducting passageway for conducting fluid vapor from the interior region of the DEF tank to the underside of the semi-permeable membrane included in the tank-breather unit in the breather-valve module and for conducting any fluid (e.g., atmospheric air) that has passed from the atmosphere and through the semi-permeable membrane into the fill-limit valve module for delivery into the interior region of the DEF tank;

FIG. 6 is a diagrammatic view similar to FIG. 5 showing diesel exhaust fluid flowing from the diesel exhaust fluid supply into the interior region of the DEF tank when the DEF delivery system is enabled and the fluid-dispensing pump nozzle is on;

FIG. 7 is a diagrammatic view similar to FIGS. 5 and 6 showing that the level of diesel exhaust fluid in the DEF tank has risen to a fill-limit vent valve closure level to raise the float valve buoyantly in the diesel exhaust fluid to cause the closure to close the vapor-outlet port associated with the first fluid-conducting passageway formed in the vapor-transfer module and thereby block flow of pressurized fluid vapor from the interior region of the DEF tank to the tank filler neck through a recirculation line coupled to each of the vapor-transfer module and the tank filler neck;

FIG. 8 is a DEF tank venting control unit in accordance with a second embodiment of the present disclosure;

FIG. 9 is an exploded perspective assembly view of components that can be assembled to produce the DEF tank venting control unit of FIG. 8;

FIG. 10 is an enlarged top view of a tank breather unit comprising the round semi-permeable membrane and the membrane-support frame shown in FIG. 9:

DETAILED DESCRIPTION

Figure 1:
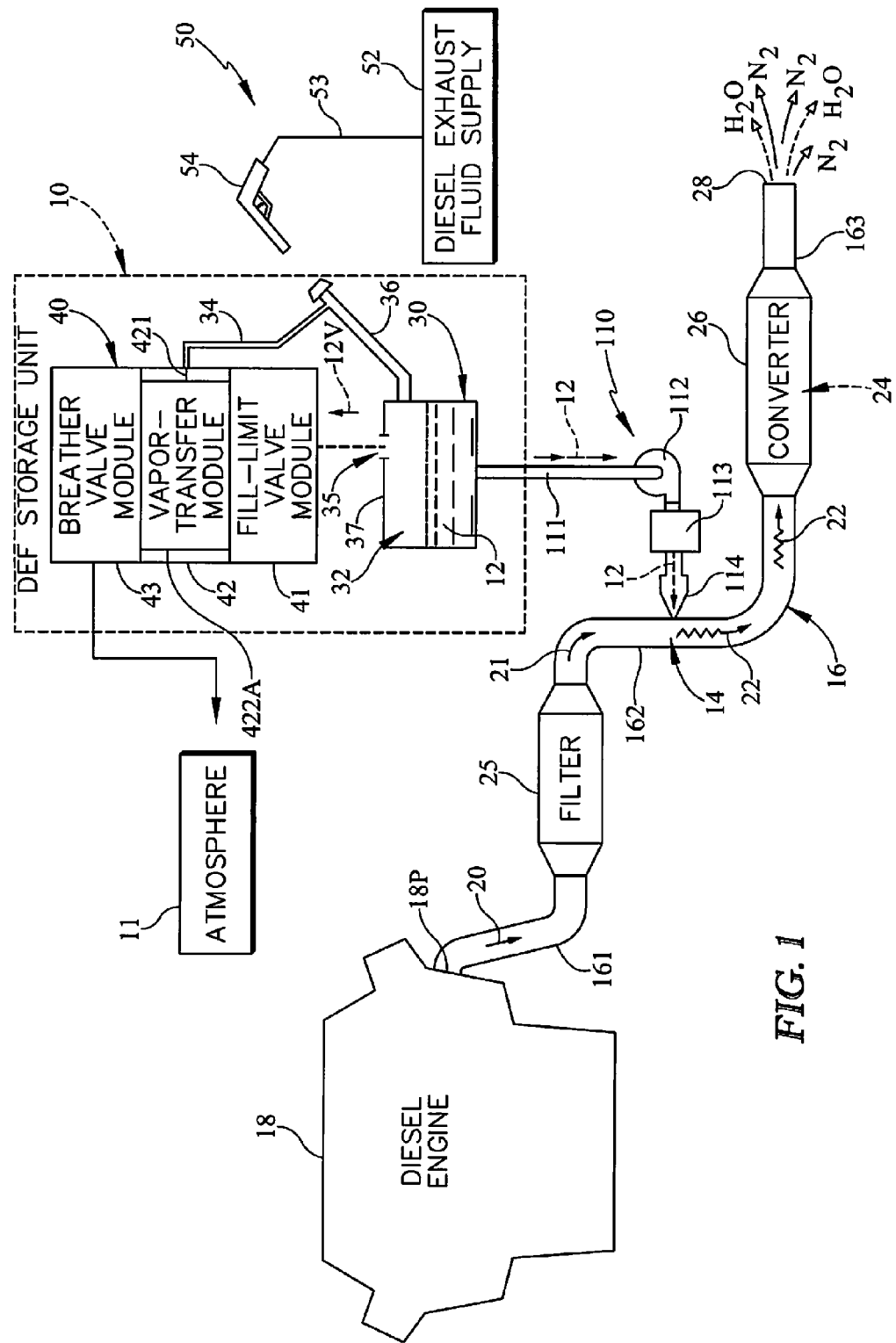
FIG. 1 is a diagrammatic view of an illustrative exhaust after-treatment system associated with a diesel engine and comprising a diesel exhaust fluid (DEF) storage unit in accordance with the present disclosure and also showing that the system includes an exhaust pipe mating with an exhaust output port formed in the diesel engine and comprising several conduits, an upstream diesel particulate filter (FILTER), and a downstream Selective Catalytic Reduction (SCR) Converter (CONVERTER), a diesel exhaust fluid supply coupled to a fluid-dispensing pump nozzle by a hose and used to supply diesel exhaust fluid to a DEF tank included in the DEF storage unit, and DEF transfer means for injecting a metered flow of diesel exhaust fluid discharged from the DEF tank into a mixing zone provided in one of the exhaust pipe conduits located downstream of the filter and upstream of the converter.

A diesel exhaust fluid (DEF) storage unit 10 in accordance with the present disclosure is used to supply a metered amount of diesel exhaust fluid 12 to a mixing zone 14 in an exhaust pipe 16 coupled to a diesel engine 18 as suggested diagrammatically in FIG. 1. In mixing zone 14, diesel exhaust fluid 12 mixes with an exhaust product (i.e., $NO_x$) 20 flowing through exhaust pipe 16 away from diesel engine 18 to produce a mixture 22 that reacts with a suitable catalyst 24 provided in a downstream Selective Catalytic Reduction (SCR) converter 26 to cause water and nitrogen to be discharged from a downstream end 28 of exhaust pipe 16 so as to minimize $NO_x$ emissions downstream from diesel engine 18.

Diesel exhaust fluid 12 is a mixture of ionized water and urea. Diesel exhaust fluid 12 is discharged as a liquid into mixing zone 14 formed in exhaust pipe 16 to produce a $NO_x$/DEF mixture 22 that is admitted into a downstream SCR converter 26 as suggested in FIG. 1. Liquid urea in diesel exhaust fluid 12 crystallizes when exposed to a sufficient amount of air so DEF storage unit 10 is a substantially sealed system designed in accordance with the present disclosure to store and maintain diesel exhaust fluid 12 in a liquid state until it is discharged from DEF tank 30 and delivered in metered amounts to mixing zone 14 in exhaust pipe 16.

DEF storage unit 10 includes a diesel exhaust fluid (DEF) tank 30 and a DEF tank venting control unit 40 formed to include, in series, a fill-limit valve module 41, a vapor-transfer module 42, and a breather-valve module 43 as shown diagrammatically in FIG. 1 and illustratively in FIGS. 2 and 5-7. DEF tank venting control unit 40 is mounted in a single unit-mount aperture 35 formed in DEF tank 30 as suggested in FIGS. 1 and 5.

Figure 5:
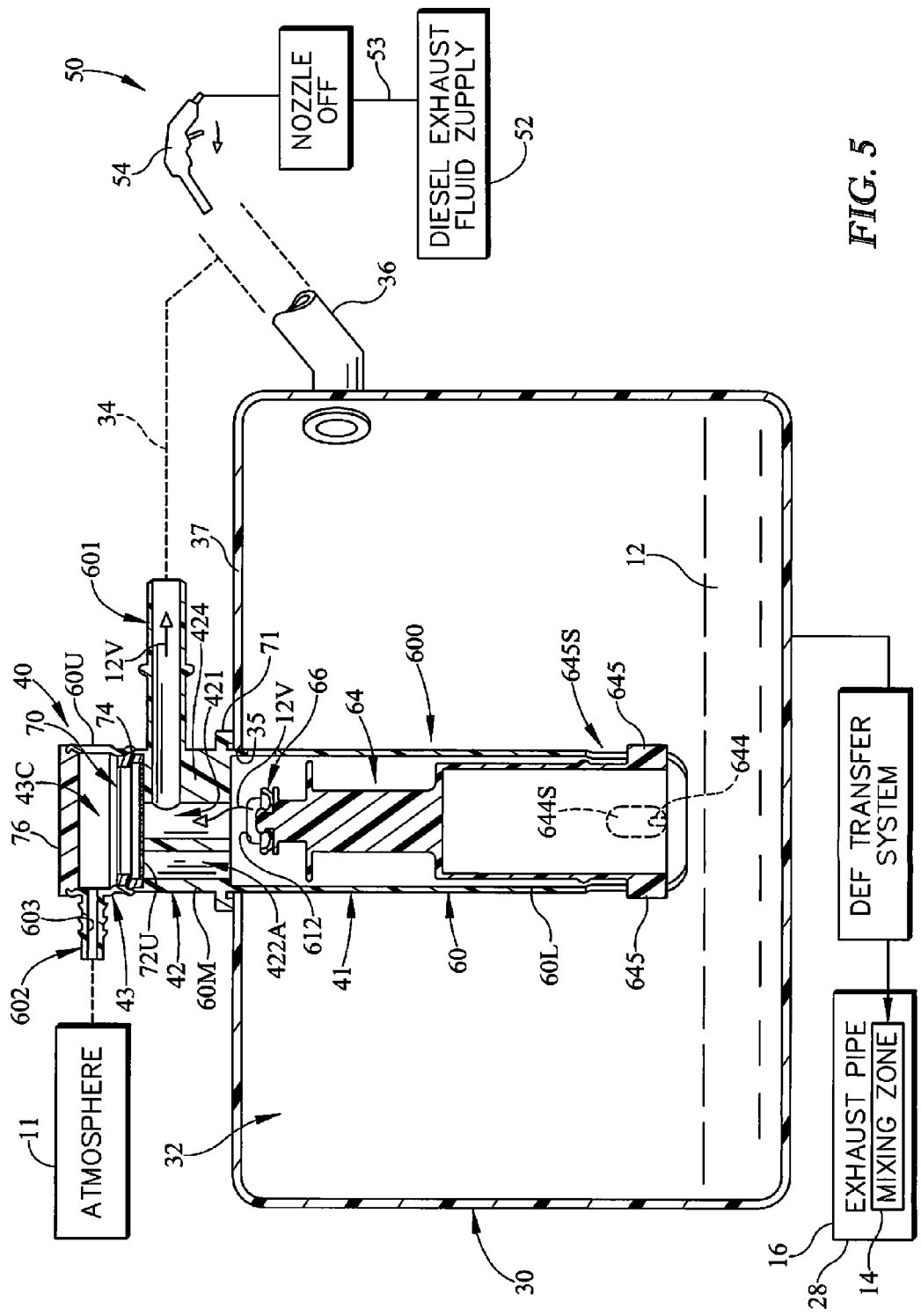
FIGS. 5-7 show operation of a fill-limit vent valve comprising a lower portion of the body and the closure shown in FIG. 2 to close a vapor-outlet port formed in the body and located above the closure during refilling of the DEF tank with more diesel exhaust fluid so as to create pressure conditions in the DEF tank and nozzle shut-off conditions in the tank filler neck to trigger a shutoff mechanism in a fluid-dispensing pump nozzle so as to shut off the flow of diesel exhaust fluid into the DEF tank from the diesel exhaust fluid supply at the proper time when the tank is full.

Fill-limit valve module 41 is located substantially inside DEF tank 30 as suggested in FIG. 5. Fill-limit valve module 41 provides means for controlling flow of fluid vapor 12V (e.g. ammonia gas) from an interior region 32 formed in DEF tank 30 to a recirculation line 34 coupled in fluid communication to vapor-transfer module 42 and a tank filler neck 36 coupled to DEF tank 30 to control shutoff of a fluid-dispensing pump nozzle 54 included in a diesel exhaust fluid (DEF) delivery system 50 during a tank-refilling activity after DEF tank 30 is full.

Breather-valve module 43 is located substantially outside DEF tank 30 as suggested in FIG. 5. Breather-valve module 43 includes a semi-permeable membrane 72 configured to provide breathing means for regulating flow of air from atmosphere 11 into interior region 32 of DEF tank 30 through vapor-transfer and fill-limit valve modules 42, 41 to maintain a selected positive vapor pressure in interior region 32 without exposing diesel exhaust fluid 12 to enough air to change from a normal liquid state to an unwanted crystalline state and also for regulating discharge of fluid vapor 12V from interior region 32 of DEF tank to atmosphere 11 through fill-limit valve and vapor-transfer modules 41, 42 to block development of a vapor pressure in interior region 32 in excess of a selected maximum pressure.

Figure 2:
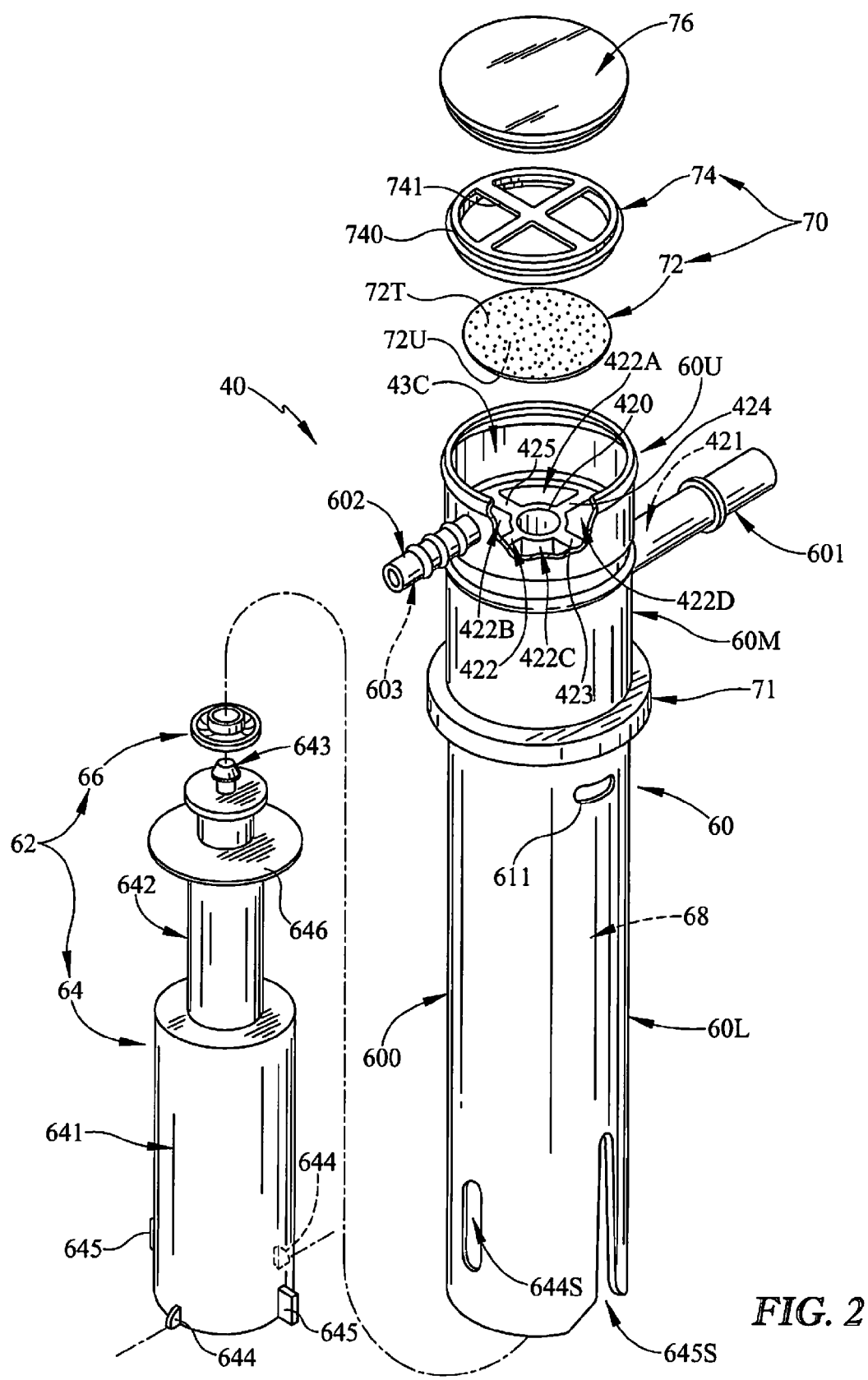
FIG. 2 is an exploded perspective assembly view of a DEF tank venting control unit in accordance with the present disclosure that is adapted to be mounted in a single unit-mount aperture formed in a top wall of the DEF tank and is configured to vent fluid vapor in a controlled manner either to a tank filler neck via a recirculation line or to the atmosphere and showing that the DEF tank venting control unit comprises (from left to right and bottom to top) a float, a closure adapted to be mounted to an upper end of the float, a body formed to include a sleeve sized to extend into an interior region of the DEF tank through the single unit-mount aperture, a large-diameter first vapor-discharge tube coupled to an upper right portion of the sleeve, a small-diameter second vapor-discharge tube coupled to an upper left portion of the sleeve, a round semi-permeable membrane located above the body, a membrane-support frame, and a round vent cap located above the membrane-support frame and configured to mate with a top end of the body.

Vapor-transfer module 42 is interposed between fill-limit valve and breather-valve modules 41, 43 as suggested diagrammatically in FIG. 1 and illustratively in FIG. 5 and is formed to include first fluid-conducting passageway 421 and, for example, four second fluid-conducting passageways 422A-D as suggested in FIG. 2. Vapor-transfer module 42 is configured to conduct fluid vapor 12V from fill-limit valve module 41 through a first fluid-conducting passageway 421 to recirculation line 34 and to conduct air and fuel vapor 12V through a second fluid-conducting passageway 422A between fill-limit valve module 41 and breather-valve module 43.

DEF tank venting control unit 40 is arranged to extend into interior region 32 of DEF tank 30 through a single unit-mount aperture 35 formed in a top wall 37 of DEF tank 30 as suggested in FIGS. 1 and 5. Fill-limit valve module 41 of DEF tank venting control unit 40 is located substantially in interior region 32 of DEF tank 30 and is exposed to diesel exhaust fluid 12 and fluid vapor 12V extant in interior region 32 as suggested in FIG. 5. Breather-valve module 43 of unit 40 is located outside of interior region 32 in an illustrative embodiment and is formed to include an interior chamber 43C in fluid communication with atmosphere 11 as suggested in FIG. 5.

Breather-valve module 43 includes a semi-permeable membrane 72 arranged to communicate fluidly with each of second fluid-conducting passageway 422A formed in vapor-transfer module 42 and interior chamber 43C formed in breather-valve module 43. Semi-permeable membrane 72 is configured to (1) block flow of liquid fluid 12 from second fluid-conducting passageway 422A into interior chamber 43C, (2) allow some fluid vapor 12V to pass from second fluid-conducting passageway 422A to atmosphere 11 through interior chamber 43C as long as a positive pressure is maintained in interior region 32 of DEF tank 30, and (3) allow some air to pass from atmosphere 11 into interior region 32 of DEF tank 30 in sequence through interior chamber 43C, second fluid-conducting passageway 422A, and the fill-limit valve module 41 to dissipate any unwanted negative pressure (i.e., vacuum) that might develop in interior region 32 of DEF tank 30 owing to exposure of DEF tank 30 to various external environmental conditions such as, for example, cool evening temperatures and without causing crystallization of the liquid diesel exhaust fluid 12 stored in DEF tank 30.

Tank venting control unit 40 includes (in an illustrative first embodiment) a body 60 and a fill limit vent valve 62 comprising a float 64 and a closure 66 coupled to an upper portion of float 64 and arranged to move up and down on liquid diesel exhaust fluid 12 admitted into a float chamber 68 formed in a lower portion 60L of body 60 to receive float 64 therein as suggested in FIGS. 2 and 5. A middle portion 60M of body 60 is formed to include first and second fluid-conducting passageways 421, 422A as suggested in FIGS. 2 and 5. An upper portion 60U of body 60 is formed to include interior chamber 43C as suggested in FIGS. 2 and 5. In an illustrative embodiment, body 60 includes a sleeve 600 defining lower, middle, and upper portions 60L, 60M, and 60U of body 60, a first vapor-discharge tube 601 coupled to middle portion 60M and formed to include a portion of first fluid-conducting passageway 421 therein, and a second fluid-discharge tube 602 coupled to upper portion 60U and formed to include a fluid-conducting passageway 603 placed in fluid communication with each of atmosphere 11 and interior chamber 43C as also suggested in FIGS. 2 and 5.

Figure 4:
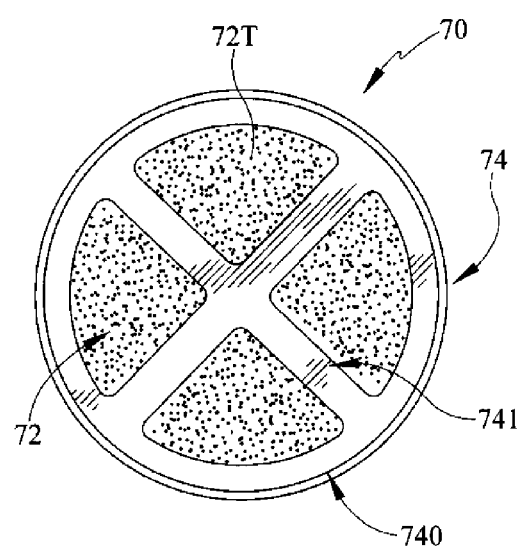
FIG. 4 is an enlarged top view of a tank breather unit comprising the round semi-permeable membrane and the membrane-support frame shown in FIG. 2.

Tank venting control unit 40 also includes a tank breather unit 70 comprising a semi-permeable membrane 72 and a membrane-support frame 74 as shown, for example, in FIGS. 2, 4, and 5. In an illustrative embodiment shown in FIG. 4, tank breather unit 70 is included in breather-valve module 43 and is coupled to a membrane housing formed to include interior chamber 43C and defined by upper portion 60U in body 60 to cause semi-permeable membrane 72 to form a vapor-flow partition having an underside 72U in fluid communication with fluid vapor 12V extant in vapor-transfer module 42 (and specifically in second fluid-conducting passageway 422A) and having a topside 72T in fluid communication with atmospheric air extant in interior chamber 43C of breather-valve module 43. A vent cap 76 is coupled to a top end of upper portion 60U in body 60 and arranged to cooperate with tank breather unit 70 to form interior chamber 43C therebetween as suggested in FIG. 5.

Fill-limit vent valve 64 includes a base 641, an closure support 642 coupled to an upper end of base 641, and a closure retainer 643 coupled to an upper end of closure support 642 as shown, for example, in FIG. 2. Fill-limit vent valve 64 also includes a pair of valve retainers 644 coupled to a lower end of base 641 and a pair of valve guides 645 also coupled to the lower end of base 641 as suggested in FIG. 2.

Closure 66 is an annular disk made of a suitable sealing material as shown, for example, in FIG. 2. Closure retainer 643 is an upstanding post in an illustrative embodiment that is arranged to extend upwardly through a center hole formed in closure 66 as suggested in FIGS. 2 and 5 so as to retain closure 66 in a stationary position on a closure-support plate 646 included in closure support 642 of fill-limit vent valve 64.

Lower portion 60L of body 60 is formed to include a float chamber 68 sized to receive a fill-limit valve 62 therein as suggested in FIG. 5. Lower portion 60L is also formed to include first and second vent apertures 611 and 612 located near top wall 37 of DEF tank 30 and arranged to allow fuel vapor 12V and air to flow therethrough between interior region 32 of DEF tank and float chamber 68 of lower portion with fluid access to first and second fluid-conducting passageways 421, 422A formed in vapor-transfer module 42 as suggested in FIGS. 2 and 5.

Figure 3:
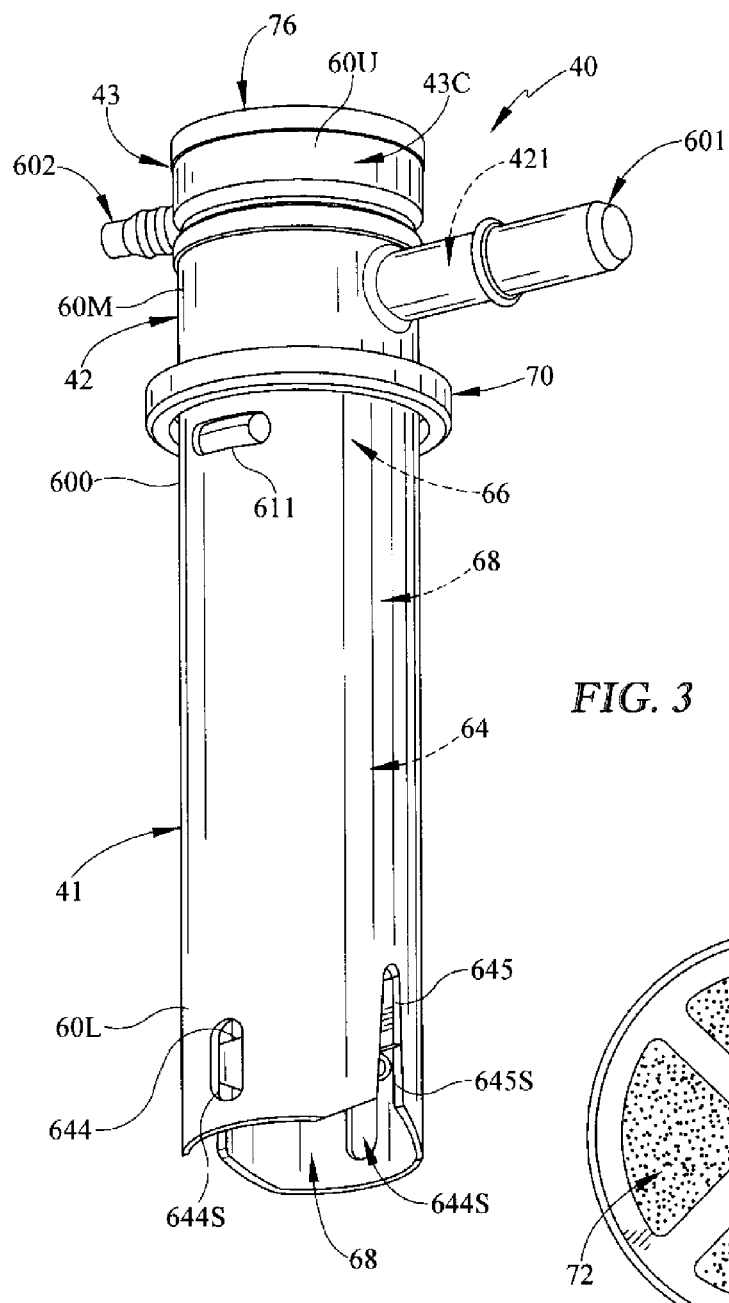
FIG. 3 is a perspective view of an illustrative DEF tank venting control unit in accordance with the present disclosure after the components shown in FIG. 2 have been assembled.

Lower portion 60L is also formed to include a retainer-receiver slot 644S for each of the valve retainers 644 included in fill-limit vent valve 64 and a guide-received slot 645S for each of valve guides 645 as suggested in FIGS. 2 and 3. Each valve retainer 644 provides means for retaining float 64 in float chamber 68 while allowing up-and-down movement of float 64 in float chamber 68 during rise and fall of diesel exhaust fluid 12 in interior region of DEF tank 30 as suggested in FIGS. 5-7. Each valve guide 645 is constrained to move up-and-down in a companion guide-receiver slot 645S to block rotation of fill-limit vent valve 62 about a central vertical axis during up-and-down movement of fill-limit vent valve 62 along that central vertical axis as suggested FIGS. 5-7.

A mount fixture 71 is coupled to an exterior portion of vapor-transfer module 42 as suggested in FIGS. 2 and 3. Mount fixture 71 is configured to mate with top wall 37 of DEF tank 30 in any suitable manner to maintain lower portion 60L of body 60 in a suspended position in interior region 32 of DEF tank 30 as suggested in FIGS. 5-7. In that suspended position, float 64 is exposed to diesel exhaust fluid 12 extant in interior region 32. Fluid vapor 12V extant in interior region 32 can flow into float chamber 68 formed in lower portion 60L of body 60 through first and second vent apertures 611, 612 formed in lower portion 60L. In an illustrative embodiment, mount fixture 71 is ring-shaped and is positioned to lie between vent apertures 611, 612 and first fluid-discharge tube 601 as suggested in FIG. 3.

Figure 6:
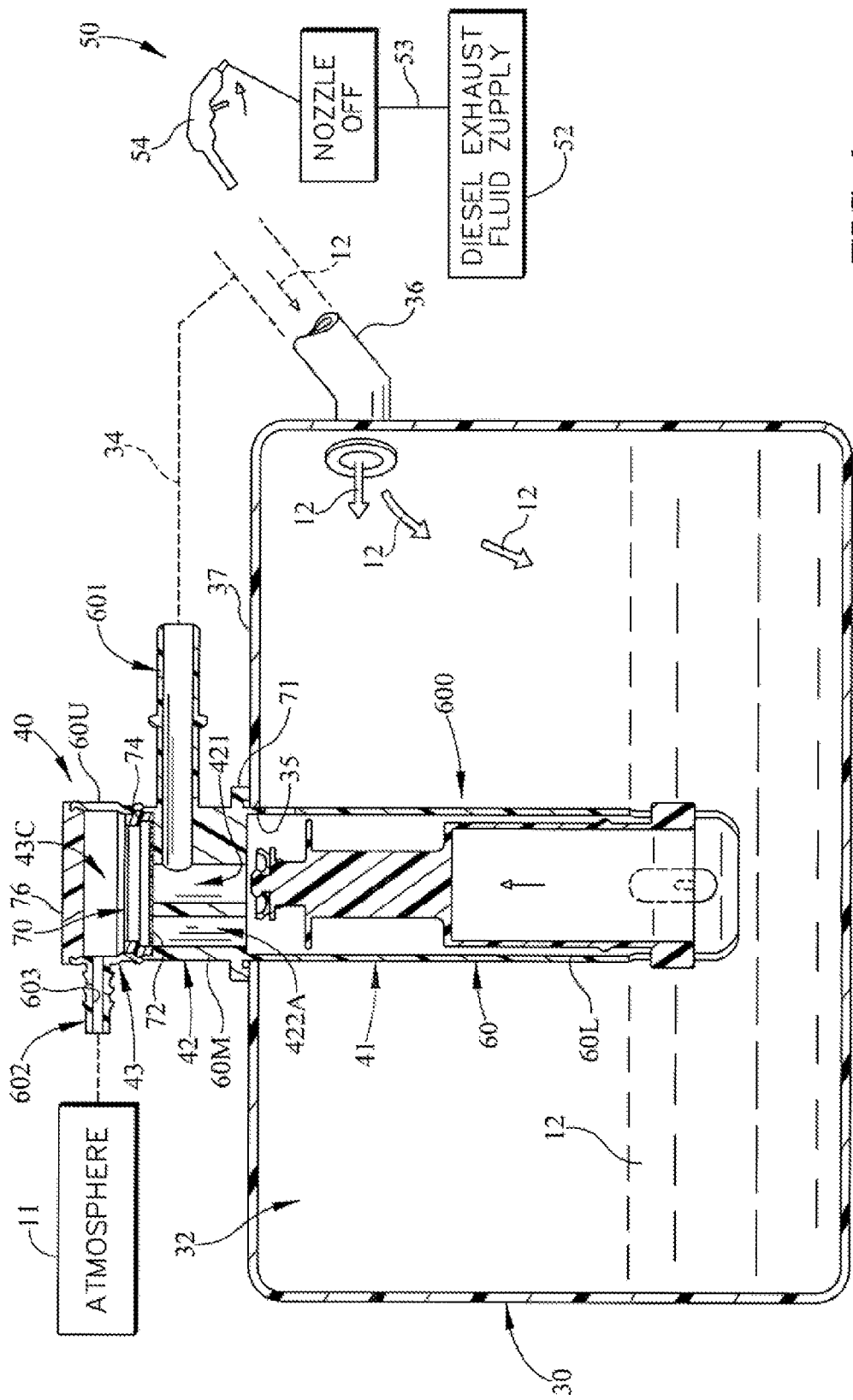
Figure 7:
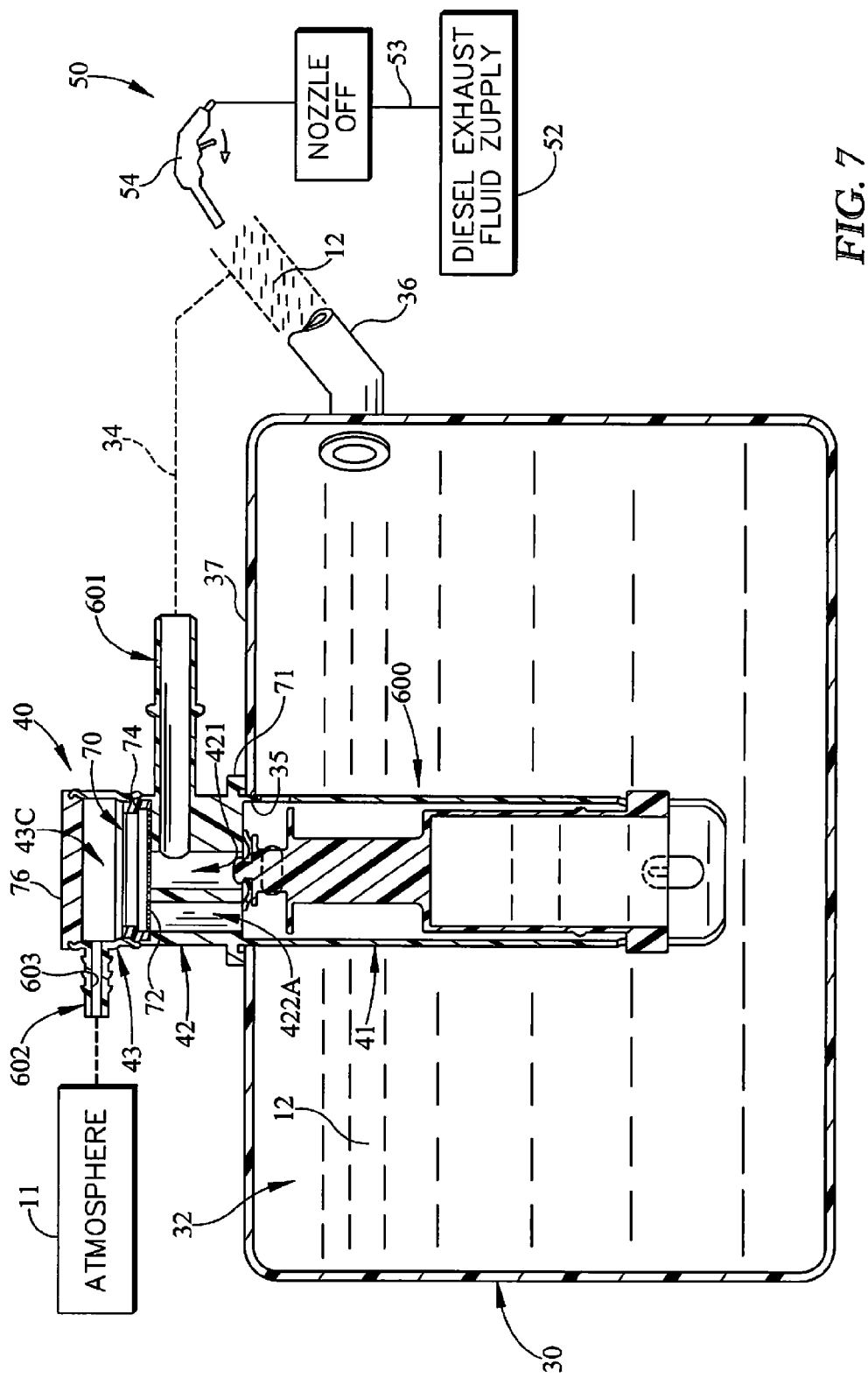

An illustrative interior configuration of vapor-transfer module 42 is shown in FIGS. 2 and 5. Vapor-transfer module includes an endless outer wall 60M arranged to extend between fill-limit valve module 41 and breather-valve module 43 as suggested in FIGS. 2 and 5. Interior tube 420 and fins 422, 423, 424 and 425 cooperate to form four separate second fluid-conducting passageways 422A, B, C, and D as suggested in FIG. 2. Each of fins 422-425 extends from interior tube 420 in a radially outward direction in uniform circumferentially spaced-apart relation to one another to mate with endless outer wall 60M included in sleeve 600 as suggested in FIG. 2. Although only one of the second fluid-conducting passageways 422A is shown in FIGS. 5-7, the other three second fluid-conducting passageways 422 B-D also lie in fluid communication with float chamber 68 and underside 72U of semi-permeable membrane 72 as suggested in FIG. 2.

Membrane-support frame 74 includes a mount ring 740 and cross-shaped retainer 741 coupled at outer ends thereof to mount right 74 as shown, for example, in FIG. 2. Cross-shaped retainer 741 is arranged to lie in confronting and mating relation to the topside 72T of semi-permeable membrane 72 as suggested in FIGS. 2 and 4. The underside 72U of semi-permeable membrane 72 is arranged to lie in confronting and mating relation to upwardly facing edges of interior tube 420 and fins 422-425 as suggested in FIG. 2.

An illustrative exhaust after-treatment system 100 is shown diagrammatically in FIG. 1. System 100 is associated with diesel engine 18 and comprises DEF storage unit 10.

Exhaust pipe 16 is configured to mate with and receive exhaust product 22 discharged from diesel engine 18 through an exhaust output part 18P formed in diesel engine 18 as suggested in FIG. 1. Exhaust pipe 16 comprises, in series, an upstream conduit 161, a diesel particulate filter 25, a midstream conduit 162, a selective catalytic reduction (SCR) converter 26, and a downstream conduit 163 as suggested in FIG. 5. Exhaust product 20 discharged from diesel engine 18 and flowing through upstream exhaust conduit 161 comprises nitrogen oxides ($NO_x$) and particulate matter (PM). The particulate matter is trapped in diesel particulate trap 25. Owing to operation of converter 26 and metered discharge of diesel exhaust fluid 12 into mixing zone 14 in midstream conduit 162, filtered exhaust product 21 flowing away from diesel particulate trap 25 through midstream conduit 162 is converted in SCR converter 26 to water and nitrogen for discharge from exhaust pipe 16 through downstream conduit 163 as suggested in FIG. 1.

Diesel exhaust fluid (DEF) transfer means 110 is provided for injecting a metered flow of diesel exhaust fluid 12 discharged from DEF tank 30 into the mixing zone 14 formed in midstream conduit 162 of filler neck 16 as suggested in FIG. 1. In illustrative embodiments, DEF transfer means comprises, in series, a discharge conduit 111, a fluid pump 112, a fluid meter 113, and a fluid-discharge nozzle 114 coupled in fluid communication to mixing zone 14 as suggested in FIG. 1. In illustrative embodiments, the diesel exhaust fluid 12 discharged into mixing zone 14 hydrolyzes into ammonia gas ($NH_3$) which mixes with flowing exhaust product 20 to produce a mixture 22 that flows into SCR converter 26. Ammonia ($NH_3$) and Nitrogen Oxides ($NO_x$) react with the catalyst 24 provide in SCR converter 26 to form nitrogen and water.

During tank refilling activity (before shutoff), fluid-dispensing pump nozzle 54 is on and dispenses liquid diesel exhaust fluid 12 into interior region 32 of DEF tank 30 as suggested in FIG. 6. Fluid level rises in interior region 32 to displace air and fuel vapor exhaust in interior region 32. Fuel vapor 12V exits interior region 32 through first and second vent apertures formed in body 60 and flows through float chamber 68 and first fluid-conducting passageway 421 to recirculation line 34 and tank filler neck 36.

As suggested in FIG. 7 (at shutoff), float 64 has risen in float chamber 68 to cause closure 66 to close the aperture opening into first fluid-conducting passageway 421. This closure increases pressure in interior region 32 of DEF tank 30 and provides shutoff for DEF delivery system 50 in a normal way.

A breathing operation begins in breather-valve module 43 (after shutoff) using semi-permeable membrane 72 in breather valve unit 70. Semi-permeable membrane 72 restricts discharge of fluid vapor 12V and liquid diesel exhaust fluid 12 to atmosphere 11 through chamber 43C but allows DEF tank 30 to breath so as to minimize unwanted high-pressure and negative-pressure conditions that might otherwise develop in DEF tank 30 under certain operating conditions. Air and fluid vapor 12V are able to flow between atmosphere 11 and interior region 32 of DEF tank 30 in accordance with predetermined flow criteria established by design of semi-permeable membrane 72 via the second fluid-conducting passageways 422A-D during normal operating conditions of system 100.

A DEF tank venting control unit 140 in accordance with a second embodiment of the present disclosure is shown in FIGS. 8-12. Unit 140 includes a semi-permeable membrane 72 as suggested in FIG. 9.

Figure 11:
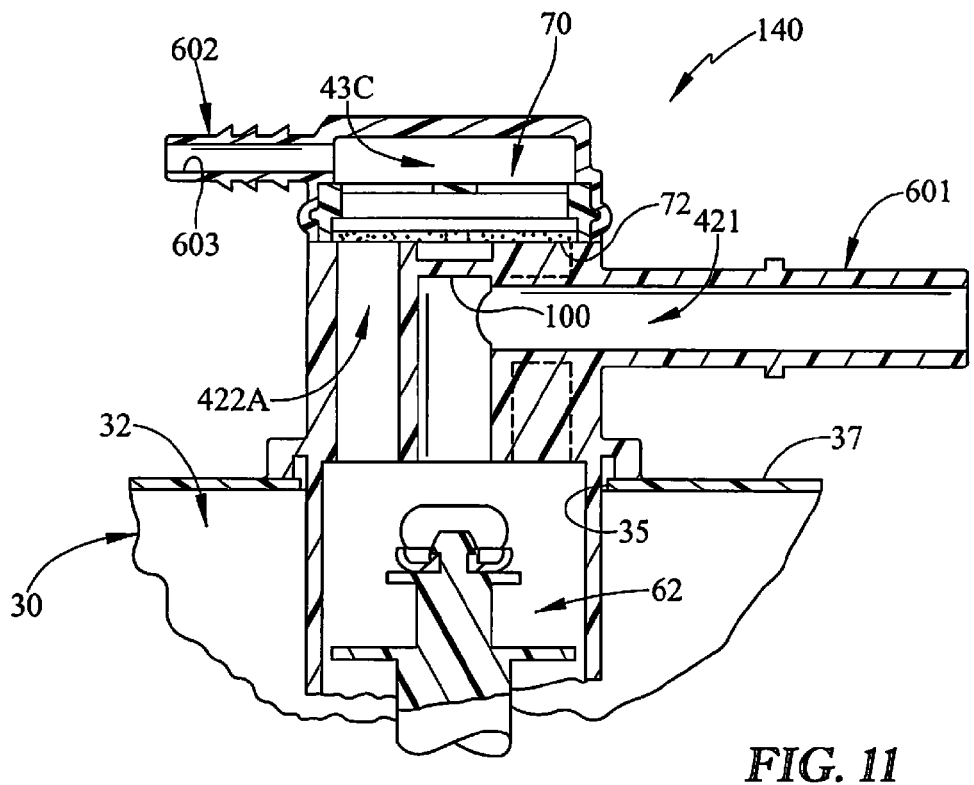
FIG. 11 is a sectional view of a DEF storage unit showing portions of the fill-limit valve module, vapor-transfer module, and breather-valve module included in the DEF tank venting control unit of FIG. 8 while the fill-limit valve remains in an opened position.
Figure 12:
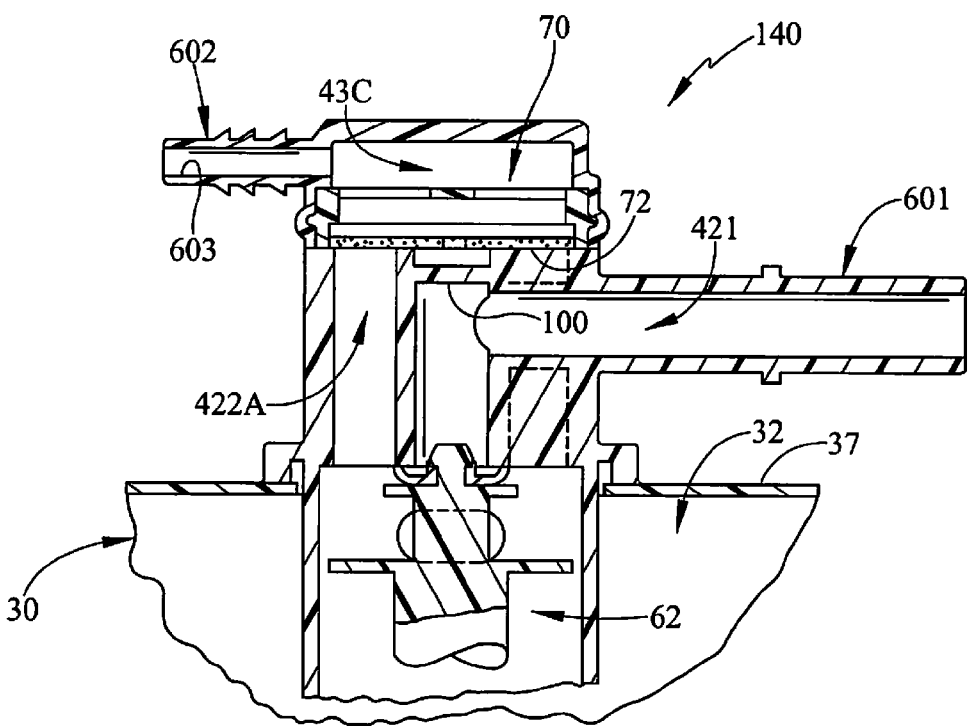
FIG. 12 is a view similar to FIG. 11 after the fill-limit valve of FIG. 11 has been moved to assume a closed position.

One difference between the embodiments shown in FIGS. 8-12 and in FIGS. 1-7 is that tank venting control unit 140 shown in FIGS. 8-12 includes means 100 for blocking fluid communication between first fluid-conducting passageway 421 and semi-permeable membrane 72 as suggested in FIGS. 11 and 12. In an illustrative embodiment, a wall is located in vapor-transfer module 42 to provide means 100.

The invention claimed is:

1. A diesel exhaust fluid storage unit adapted to supply a metered amount of diesel exhaust fluid provided in a diesel exhaust fluid tank to a mixing zone in an exhaust pipe coupled to a diesel engine, the diesel exhaust fluid storage unit comprising
a diesel exhaust fluid tank venting control unit formed to include a fill-limit valve module adapted to receive diesel exhaust fluid from a diesel exhaust fluid tank, a breather-valve module exposed to the atmosphere, and a vapor-transfer module interposed between and coupled in fluid communication to each of the fill-limit valve module and the breather-valve module, wherein the breather-valve module includes an interior chamber and a semi-permeable membrane having a topside exposed to atmospheric air admitted into the interior chamber and an underside exposed to fluid vapor associated with diesel exhaust fluid in the diesel exhaust fluid tank and fluid vapor conducted through vapor transfer module.

2. The diesel exhaust fluid storage unit of claim 1, wherein the vapor-transfer module is formed to include
a first fluid-conducting passageway configured to provide means for carrying fluid vapor associated with diesel exhaust fluid extant in the diesel exhaust fluid tank and discharged from the fill-limit valve module and an interior region of the diesel exhaust fluid tank to a recirculation line coupled to a tank filler neck associated with the diesel exhaust fluid tank during normal use and refilling of the diesel exhaust fluid tank until the level of diesel exhaust fluid in an interior region of the tank has risen to a fill-limit closure level causing a fill-limit valve included in the fill-limit valve module to move to close an inlet opening into the first fluid-conducting passageway so that tank pressure in the diesel exhaust fluid tank rises and forces diesel exhaust fluid up the tank filler neck to trigger a shut-off mechanism included in a fluid-dispensing pump nozzle used to discharge fluid from a diesel exhaust fluid supply into the tank filler neck and
a second fluid-conducting passageway configured to provide means separate from the first fluid-conducting passageway for conducting fluid vapor extant in the interior region of the diesel exhaust fluid tank and extant in the fill-limit valve module to the underside of the semi-permeable membrane included in the breather-valve module.

3. The diesel exhaust fluid storage unit of claim 2, wherein the semi-permeable membrane is configured to provide breathing means for regulating discharge of fluid vapor through the semi-permeable membrane to the atmosphere and also for regulating admission of atmospheric air through the semi-permeable membrane into the interior region of the diesel exhaust fluid tank to dissipate any unwanted negative pressure developed in the interior region of the diesel exhaust fluid tank without exposing diesel exhaust fluid in the diesel exhaust fluid tank to enough air to cause that diesel exhaust fluid to change from a liquid state to an unwanted crystalline state.

4. The diesel exhaust fluid storage unit of claim 1, wherein the vapor-transfer module is formed to include a first fluid-conducting passageway arranged to communicate fluid vapor from the fill-limit valve module to an external recirculation line and a separate second fluid-conducting passageway arranged to communicate fluid vapor and atmospheric air between the fill-limit valve module and the breather-valve module and the semi-permeable membrane is arranged to communicate fluidly with each of the second fluid-conducting passageway formed in the vapor-transfer module and the interior chamber formed in the breather-valve module.

5. The diesel exhaust fluid storage unit of claim 4, wherein the semi-permeable membrane is configured to provide means for blocking flow of liquid fluid from the second fluid-conducting passageway into the interior chamber and for allowing some fluid vapor to pass from the second fluid-conducting passageway formed in the vapor-transfer module to the atmosphere through the interior chamber formed in the breather-valve module as long as a positive pressure is maintained in the interior region of the diesel exhaust fluid tank and for allowing some atmospheric air to pass from the atmosphere into the interior region of the diesel exhaust fluid tank in sequence through the interior chamber formed in the breather-valve module, the second fluid-conducting passageway formed in the vapor-transfer module, and the fill-limit valve module to dissipate an unwanted negative pressure that might develop in the interior region of the diesel exhaust fluid tank without causing crystallization of liquid diesel exhaust fluid stored in the interior region.

6. The diesel exhaust fluid storage unit of claim 4, wherein the vapor-transfer module includes an endless outer wall arranged to extend between the fill-limit valve module and the breather-valve module, an interior tube arranged to extend through a space bounded by the endless outer wall and formed to define a portion of the first fluid-conducting passageway, and first and second fins coupled to the interior tube and to the endless outer wall and arranged to lie in spaced-apart relation to one another to define the second fluid-conducting passageway therebetween.

7. The diesel exhaust fluid storage unit of claim 1, wherein the semi-permeable membrane in the breather-valve module is configured to provide breathing means for regulating flow of atmospheric air into the interior region of the diesel exhaust fluid tank through the vapor-transfer and fill-limit valve modules to maintain a selected positive vapor pressure in the interior region of the diesel exhaust fluid tank without exposing diesel exhaust fluid in the interior region to enough air to change from a normal liquid state to an unwanted crystalline state and also for regulating discharge of fluid vapor from the interior region of the diesel exhaust fluid tank to the atmosphere through the fill-limit valve and vapor-transfer modules to block development of a vapor pressure in the interior region in excess of a selected maximum pressure.

8. The diesel exhaust fluid storage unit of claim 7, wherein the breather-valve module includes a membrane housing formed to include an interior chamber and a tank breather unit comprising the semi-permeable membrane and a membrane-support frame coupled to the membrane housing and to the semi-permeable membrane to cause the topside of the semi-permeable membrane to be exposed to atmospheric air admitted into the interior chamber and the underside of the semi-permeable membrane to be exposed to the fluid vapor extant in the fuel vapor-module.

9. The diesel exhaust fluid storage unit of claim 8, wherein the diesel exhaust fluid tank venting control unit further includes a sleeve including, in series, upper, middle, and lower portions, the membrane housing defines the upper portion of the sleeve, the fill-limit valve module includes a fill-limit valve mounted for movement in the lower portion of the sleeve to regulate flow of fuel vapor from the fill-limit valve module into the vapor-transfer module, and the vapor-transfer module is located in the middle portion of the sleeve.

10. The diesel exhaust fluid storage unit of claim 9, further comprising a diesel exhaust fluid tank formed to include an interior region and a sleeve-receiving aperture opening into the interior region and wherein the sleeve is arranged to extend into the interior region through the sleeve-receiving aperture to locate the fill-limit valve module in the interior region and the breather-valve module outside of the interior region.

11. The diesel exhaust fluid storage unit of claim 10, wherein the fuel-vapor transfer module is located outside of the interior region and above the fill-limit valve module and below the breather-valve module.

12. The diesel exhaust fluid storage unit of claim 10, wherein the diesel exhaust fluid tank includes a top wall formed to include the sleeve-receiving aperture and the breather-valve module is located above and in spaced-apart relation to the top wall of the diesel exhaust fluid tank.

13. A diesel exhaust fluid storage unit adapted to supply a metered amount of diesel exhaust fluid provided in a diesel exhaust fluid tank to a mixing zone in an exhaust pipe coupled to a diesel engine, the diesel exhaust fluid storage unit comprising
an elongated sleeve including, in series, a lower portion, a middle portion, and an upper portion,
wherein the lower portion of the elongated sleeve is formed to include a float chamber and a fill-limit valve mounted for up-and-down movement in the float chamber to open and close an inlet into a first fluid-conducting passageway formed in the middle portion of the elongated sleeve,
wherein the middle portion of the elongated sleeve is also formed to include a second fluid-conducting passageway separate from the first fluid-conducting passageway and arranged to communicate fluid vapor and atmospheric air between the fill-limit valve module and the upper portion of the sleeve, and
wherein the upper portion of the elongated sleeve is formed to include an interior chamber open to atmospheric air and a semi-permeable membrane having a topside exposed to atmospheric air admitted into the interior chamber and an underside exposed to fluid vapor conducted through the second fluid-conducting passageway.

14. The diesel fuel exhaust fluid storage unit of claim 13, further comprising a diesel exhaust fluid tank formed to include an interior region and a sleeve-receiving aperture opening into the interior region and wherein the sleeve is arranged to extend into the interior region through the sleeve-receiving aperture to locate the fill-limit valve in the interior region and the semi-permeable membrane outside of the interior region.

15. The diesel fuel exhaust fluid storage unit of claim 14, wherein the diesel exhaust fluid tank includes a top wall formed to include the sleeve-receiving aperture and the semi-permeable membrane is located above and in spaced-apart relation to the top wall of the diesel exhaust fluid tank.

16. A diesel exhaust fluid storage unit adapted to supply a metered amount of diesel exhaust fluid provided in a diesel exhaust fluid tank to a mixing zone in an exhaust pipe coupled to a diesel engine, the diesel exhaust fluid storage unit comprising
- a diesel exhaust fluid tank formed to include an interior region and a unit-mount aperture formed in a top wall of the diesel exhaust fluid tank to open into the interior region and
- a tank venting control unit arranged to extend into the interior region of the diesel exhaust fluid tank through the unit-mount aperture, wherein the tank venting control unit includes a fill-limit valve module located in the interior region of the diesel exhaust fluid tank, a breather-valve module located outside of the interior region of the diesel exhaust fluid tank in spaced-apart relation to the top wall of the diesel exhaust fluid tank, and a vapor-transfer module located outside of the interior region of the diesel exhaust fluid tank and interposed between and in fluid communication with each of the fill-limit valve and breather-valve modules.

* * * * *